(12) United States Patent
Liu et al.

(10) Patent No.: US 9,936,164 B2
(45) Date of Patent: Apr. 3, 2018

(54) MEDIA CONTROL METHOD AND DEVICE

(71) Applicant: Huawei Technologies Co., Ltd., Shenzhen (CN)

(72) Inventors: Yan Liu, Shenzhen (CN); Weiwei Yang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/468,846

(22) Filed: Mar. 24, 2017

(65) Prior Publication Data

US 2017/0201720 A1 Jul. 13, 2017

Related U.S. Application Data

(63) Continuation of application No. PCT/CN2015/089049, filed on Sep. 7, 2015.

(30) Foreign Application Priority Data

Sep. 26, 2014 (CN) .......................... 2014 1 0504812

(51) Int. Cl.
*H04N 7/14* (2006.01)
*H04N 7/15* (2006.01)
*H04L 29/06* (2006.01)

(52) U.S. Cl.
CPC ......... *H04N 7/152* (2013.01); *H04L 65/1063* (2013.01); *H04L 65/1069* (2013.01); *H04L 65/403* (2013.01); *H04N 7/147* (2013.01)

(58) Field of Classification Search
CPC ........ H04N 7/141; H04N 7/152; E04H 15/06; G06F 11/1458; G06F 11/2018; G06F 11/203

(Continued)

(56) References Cited

U.S. PATENT DOCUMENTS 7,599,682 B2 * 10/2009 Takeda ................ H04L 12/1822
370/312
2003/0088677 A1 5/2003 Yamamoto
(Continued)

FOREIGN PATENT DOCUMENTS

CN 101420315 A 4/2009
CN 101427513 A 5/2009
(Continued)

OTHER PUBLICATIONS

Foreign Communication From a Counterpart Application, PCT Application No. PCT/CN2015/089049, English Translation of International Search Report dated Nov. 25, 2015, 2 pages.
(Continued)

*Primary Examiner* — Binh Kien Tieu
(74) *Attorney, Agent, or Firm* — Conley Rose, P.C.

(57) ABSTRACT

A media control method and device are presented. The method includes obtaining media information and receiving a session request sent by the user equipment; obtaining, according to a media object identifier carried in a media control policy, attribute information of a media object corresponding to the media object identifier carried in the media control policy, from the media information, and obtaining a session identifier and channel information that are corresponding to the media object identifier carried in the media control policy, from the session request; and sending a media operation instruction included in the media control policy, the obtained attribute information of the media object, and the obtained channel information to the user equipment that sends the session identifier, where the media operation instruction is used to instruct the user equipment to operate the received attribute information of the media object and the received channel information.

20 Claims, 5 Drawing Sheets

(58) Field of Classification Search
USPC ............... 348/14.01, 14.05, 14.08, 14.09
See application file for complete search history.

(56) References Cited

U.S. PATENT DOCUMENTS

| | | | |
|---|---|---|---|
| 2008/0107130 | A1 | 5/2008 | Peters, Jr. et al. |
| 2009/0279455 | A1* | 11/2009 | Wang ............... H04L 51/36 370/260 |
| 2014/0078240 | A1* | 3/2014 | Yang ............... H04N 7/15 348/14.03 |
| 2014/0139618 | A1* | 5/2014 | Ye ............... H04N 7/147 348/14.09 |
| 2015/0081796 | A1* | 3/2015 | Xu ............... H04L 65/607 709/204 |
| 2015/0113591 | A1 | 4/2015 | Feng et al. |
| 2015/0181164 | A1 | 6/2015 | Yang et al. |

FOREIGN PATENT DOCUMENTS

| | | |
|---|---|---|
| CN | 102404130 A | 4/2012 |
| CN | 102843542 A | 12/2012 |
| CN | 102904936 A | 1/2013 |
| CN | 103840949 A | 6/2014 |
| WO | 2009046756 A1 | 4/2009 |

OTHER PUBLICATIONS

Foreign Communication From a Counterpart Application, PCT Application No. PCT/CN2015/089049, English Translation of Written Opinion dated Nov. 25, 2015, 5 pages.

"3rd Generation Partnership Project;Technical Specification Group Core Network and Terminals; Conferencing using the IP Multimedia (IM) CoreNetwork(CN) subsystem; Stage 3 (Release 12)," XP050925903, 3GPP TS 24.147, V123.0, Technical Specification, Sep. 2014, 209 pages.

"3rd Generation Partnership Project; Technical Specification Group Core Network and Terminals Media server control using the IP Multimedia (IM) Core Network(CN) subsystem; Stage 3 (Release 8)," XP051295732, 3GPP TR 24.880, V8.2.0, Technical Report, Jun. 2008, 52 pages.

"Push to Communicate for Public Safety Contra! Plane," XP064179506, Open Mobile Alliance, OMA-PCPS-TSControl_Plane-V1_0-20140903-D, Draft Version 1.0, Part 1, Sep. 3, 2014, 74 pages.

"Push to Communicate for Public Safety Contra! Plane," XP064179506, Open Mobile Alliance, OMA-PCPS-TSControl_Plane-V1_0-20140903-D, Draft Version 1.0, Part 2, Sep. 3, 2014, 124 pages.

"Push to Communicate for Public Safety Contra! Plane," XP064179506, Open Mobile Alliance, OMA-PCPS-TSControl_Plane-V1_0-20140903-D, Draft Version 1.0, Part 3, Sep. 3, 2014, 78 pages.

"Push to Communicate for Public Safety Contra! Plane," XP064179506, Open Mobile Alliance, OMA-PCPS-TSControl_Plane-V1_0-20140903-D, Draft Version 1.0, Part 4, Sep. 3, 2014, 76 pages.

"Push to Communicate for Public Safety Contra! Plane," XP064179506, Open Mobile Alliance, OMA-PCPS-TSControl_Plane-V1_0-20140903-D, Draft Version 1.0, Part 5, Sep. 3, 2014, 94 pages.

"Push to Communicate for Public Safety Contra! Plane," XP064179506, Open Mobile Alliance, OMA-PCPS-TSControl_Plane-V1_0-20140903-D, Draft Version 1.0, Part 6, Sep. 3, 2014, 104 pages.

"Push to Communicate for Public Safety Contra! Plane," XP064179506, Open Mobile Alliance, OMA-PCPS-TSControl_Plane-V1_0-20140903-D, Draft Version 1.0, Part 7, Sep. 3, 2014, 106 pages.

"Push to Communicate for Public Safety Contra! Plane," XP064179506, Open Mobile Alliance, OMA-PCPS-TSControl_Plane-V1_0-20140903-D, Draft Version 1.0, Part 8, Sep. 3, 2014, 113 pages.

Foreign Communication From a Counterpart Application, European Application No. 15843212.0, Extended European Search Report dated Aug. 11, 2017, 15 pages.

Foreign Communication From a Counterpart Application, Chinese Application No. 201410504812.X, Chinese Office Action dated Feb. 1, 2018, 6 pages.

* cited by examiner

MEDIA CONTROL METHOD AND DEVICE

CROSS-REFERENCE TO RELATED APPLICATIONS

This application is a continuation of International Patent Application No. PCT/CN2015/089049, filed on Sep. 7, 2015, which claims priority to Chinese Patent Application No. 201410504812.X, filed on Sep. 26, 2014, both of which are hereby incorporated by reference in their entireties.

TECHNICAL FIELD

The present disclosure relates to the field of communications technologies, and in particular, to a media control method and a media control device.

BACKGROUND

As video conferencing and various intelligent terminals develop, a conference site has developed from having a single camera, a single active video, and a display for a single active picture to having multiple cameras, multiple active videos, and a display for multiple active pictures; and the intelligent terminal has also developed from having no camera lens to having multiple camera lens. Therefore, traditional point-to-point communication or multi-point communication is changing from a single audio-video stream to multiple audio-video streams.

To enable each participant in multi-stream communication to select information about a media stream from multiple perspectives, the Internet Engineering Task Force (IETF) introduces a controlling multiple streams for telepresence (CLUE) protocol. The protocol describes location information of media content, information about a site, and information about participants in a media capture area, and defines a set of media announcements/configuration information used to transfer media information.

In a scenario in which multi-stream communication is implemented in a multi-party session, each participant uses a CLUE message to announce media information of the participant to a central node; the central node reconstructs a new media announcement message according to the received media information announced by each participant, and sends the new media announcement message to each participant. Therefore, each participant can receive media information announced by another participant, and dominates, with reference to a capability of the participant, the received media information announced by the another participant.

In particular, as a quantity of participant terminals increases, an amount of information used to announce the media information increases accordingly. However, because each participant currently can dominate, according to a capability of the participant, media of the another participant, the central node cannot control, according to a conference policy, media dominated by each participant. That is, in a large conference, each participant can dominate media as the participant wishes, and a conference center cannot centrally control media of each participant. Consequently, control over media at a whole site is relatively disordered, which leads to weaker control over the media at the whole site by the central node.

SUMMARY

In view of this, embodiments of the present disclosure provide a media control method and a media control device, which are used to resolve a currently existing problem that control over media at a whole site by a central node is relatively poor because control over the media at the whole site is relatively disordered.

According to a first aspect of the present disclosure, a media control method is provided, including obtaining, by a conference center, media information sent from user equipment, and receiving a session request sent by the user equipment, where the media information carries a media object identifier and attribute information of a media object corresponding to the media object identifier, and the session request carries a session identifier, the media object identifier, and information about a channel that is used to transmit the media object corresponding to the media object identifier; obtaining, by the conference center according to a media object identifier carried in a media control policy, attribute information of a media object corresponding to the media object identifier carried in the media control policy, from the media information, and obtaining a session identifier and channel information that are corresponding to the media object identifier carried in the media control policy, from the session request; and sending, by the conference center, a media operation instruction included in the media control policy, the obtained attribute information of the media object, and the obtained channel information to the user equipment that sends the session identifier, where the media operation instruction is used to instruct the user equipment to operate the received attribute information of the media object and the received channel information.

With reference to the possible implementation manner of the first aspect of the present disclosure, in a first possible implementation manner, the sending, by the conference center, a media operation instruction included in the media control policy, the obtained attribute information of the media object, and the obtained channel information to the user equipment that sends the session identifier includes sending, by the conference center, a session message to the user equipment that sends the session identifier, where the session message carries the obtained channel information; and sending, by the conference center, a media configuration message to the user equipment that sends the session identifier, where the media configuration message carries the obtained attribute information of the media object; where the media operation instruction included in the media control policy is sent using the session message or the media configuration message.

With reference to the possible implementation manner of the first aspect of the present disclosure, or with reference to the first possible implementation manner of the first aspect of the present disclosure, in a second possible implementation manner, if the conference center is a conference application server, the obtaining, by a conference center, media information sent from user equipment includes receiving, by the conference application server, a session notification sent by a network element device, where the session notification carries media information and a session identifier of a session request that has an association relationship with the media information, the media information is obtained by the network element device from a media announcement message sent by the user equipment, and the network element device provides a media resource function; where the association relationship between the media information and the session request is determined by the network element device according to the media object identifier carried in the received session request sent by the user equipment and a media object identifier carried in the received media announcement message sent by the user equipment; and the method further includes determining, by the conference application server after receiving the session request sent by the user equipment, the association relationship between the received session request and the received media information according to the session identifier carried in the session request and the session identifier carried in the received session notification.

With reference to the second possible implementation manner of the first aspect of the present disclosure, in a third possible implementation manner, the sending, by the conference center, a media operation instruction included in the media control policy, the obtained attribute information of the media object, and the obtained channel information to the user equipment that sends the session identifier includes sending, by the conference application server, the session message to the user equipment that sends the session identifier, where the session message carries the media operation instruction and the obtained channel information; and sending, by the conference application server, the obtained attribute information of the media object and the obtained session identifier to the network element device, and instructing the network element device to send the media configuration message to the user equipment that sends the session identifier, where the media configuration message carries the obtained attribute information of the media object.

With reference to the possible implementation manner of the first aspect of the present disclosure, or with reference to the first possible implementation manner of the first aspect of the present disclosure, in a fourth possible implementation manner, if the conference center is a network element device that provides a media resource function, the obtaining, by a conference center, media information sent from user equipment includes receiving, by the network element device, a media announcement message sent by the user equipment, and obtaining, from the media announcement message, the media information sent by the user equipment, where the media announcement message carries the media information; and the method further includes determining, by the network element device after obtaining the media information from the user equipment and receiving the session request sent by the user equipment, an association relationship between the obtained media information and the received session request according to the media object identifier of the media information carried in the media announcement message and the media object identifier carried in the session request.

With reference to the fourth possible implementation manner of the first aspect of the present disclosure, in a fifth possible implementation manner, the method further includes receiving, by the network element device, a media control policy sent by a conference application server; and obtaining, by the network element device according to a media object identifier carried in the media control policy, attribute information of a media object corresponding to the media object identifier carried in the media control policy, from the media information, and obtaining a session identifier and channel information that are corresponding to the media object identifier carried in the media control policy, from the session request, including determining, by the network element device according to the media object identifier carried in the media control policy, the media information and the session request that include the media object identifier carried in the media control policy and have the association relationship; and obtaining the attribute information of the media object corresponding to the media object identifier carried in the media control policy, from the determined media information, and obtaining the session identifier and the channel information that are corresponding to the media object identifier carried in the media control policy, from the determined session request.

With reference to the fourth possible implementation manner of the first aspect of the present disclosure, or with reference to the fifth possible implementation manner of the first aspect of the present disclosure, in a sixth possible implementation manner, the sending, by the conference center, a media operation instruction included in the media control policy, the obtained attribute information of the media object, and the obtained channel information to the user equipment that sends the session identifier includes sending, by the network element device, the session message and the media configuration message to the user equipment that sends the session identifier; where the session message includes the obtained channel information, the media configuration message includes the obtained attribute information of the media object, and the media operation instruction included in the media control policy is sent using the session message or the media configuration message.

With reference to the possible implementation manner of the first aspect of the present disclosure, with reference to the first possible implementation manner of the first aspect of the present disclosure, with reference to the second possible implementation manner of the first aspect of the present disclosure, with reference to the third possible implementation manner of the first aspect of the present disclosure, with reference to the fourth possible implementation manner of the first aspect of the present disclosure, with reference to the fifth possible implementation manner of the first aspect of the present disclosure, or with reference to the sixth possible implementation manner of the first aspect of the present disclosure, in a seventh possible implementation manner, the method further includes comparing, by the conference center after obtaining the media information and the session request, the media object identifier carried in the media information with the media object identifier carried in the session request; and establishing, when the media object identifier carried in the media information and the media object identifier carried in the session request are the same, a mapping relationship between the session identifier carried in the session request, the media object identifier, the channel information, and the attribute information of the media object corresponding to the media object identifier carried in the media information.

With reference to the possible implementation manner of the first aspect of the present disclosure, with reference to the first possible implementation manner of the first aspect of the present disclosure, with reference to the second possible implementation manner of the first aspect of the present disclosure, with reference to the third possible implementation manner of the first aspect of the present disclosure, with reference to the fourth possible implementation manner of the first aspect of the present disclosure, with reference to the fifth possible implementation manner of the first aspect of the present disclosure, with reference to the sixth possible implementation manner of the first aspect of the present disclosure, or with reference to the seventh possible implementation manner of the first aspect of the present disclosure, in an eighth possible implementation manner, the method further includes sending the obtained media information to a device entity that is configured to present an interface, so that the device entity that is configured to present the interface displays the media object corresponding to the media object identifier carried in the received media information on a control interface.

According to a second aspect of the present disclosure, a media control device is provided, including a receiving module configured to obtain media information sent from user equipment, and receive a session request sent by the user equipment, where the media information carries a media object identifier and attribute information of a media object corresponding to the media object identifier, and the session request carries a session identifier, the media object identifier, and information about a channel that is used to transmit the media object corresponding to the media object identifier; a determining module, configures to obtain, according to a media object identifier carried in a media control policy, attribute information of a media object corresponding to the media object identifier carried in the media control policy, from the media information obtained by the receiving module, and obtain a session identifier and channel information that are corresponding to the media object identifier carried in the media control policy, from the session request received by the receiving module; and a sending module configured to send a media operation instruction included in the media control policy, the obtained attribute information of the media object, and the obtained channel information to the user equipment that sends the session identifier, where the media operation instruction is used to instruct the user equipment to operate the received attribute information of the media object and the received channel information.

With reference to the possible implementation manner of the second aspect of the present disclosure, in a first possible implementation manner, the sending module is configured to send a session message to the user equipment that sends the session identifier, where the session message carries the obtained channel information; and send a media configuration message to the user equipment that sends the session identifier, where the media configuration message carries the obtained attribute information of the media object; where the media operation instruction included in the media control policy is sent using the session message or the media configuration message.

With reference to the possible implementation manner of the second aspect of the present disclosure, or with reference to the first possible implementation manner of the second aspect of the present disclosure, in a second possible implementation manner, if the media control device is a conference application server, the receiving module is configured to receive a session notification sent by a network element device and receive the session request sent by the user equipment, where the session notification carries media information and a session identifier of a session request that has an association relationship with the media information, the media information is obtained by the network element device from a media announcement message sent by the user equipment, and the network element device provides a media resource function; where the association relationship between the media information and the session request is determined by the network element device according to the media object identifier carried in the received session request sent by the user equipment and a media object identifier carried in the received media announcement message sent by the user equipment; and the media control device further includes an association module configured to, when the receiving module receives the session request sent by the user equipment, determine the association relationship between the received session request and the received media information according to the session identifier carried in the session request and the session identifier carried in the received session notification.

With reference to the second possible implementation manner of the second aspect of the present disclosure, in a third possible implementation manner, the sending module is configured to send the session message to the user equipment that sends the session identifier, where the session message carries the media operation instruction and the obtained channel information; and send the obtained attribute information of the media object and the obtained session identifier to the network element device, and instruct the network element device to send the media configuration message to the user equipment that sends the obtained session identifier, where the media configuration message carries the obtained attribute information of the media object.

With reference to the possible implementation manner of the second aspect of the present disclosure, or with reference to the first possible implementation manner of the second aspect of the present disclosure, in a fourth possible implementation manner, if the media control device is a network element device that provides a media resource function, the receiving module is configured to receive a media announcement message sent by the user equipment, receive the session request sent by the user equipment, and obtain the media information sent by the user equipment from the media announcement message, where the media announcement message carries the media information; and the media control device further includes an association module configured to, when the receiving module obtains the media information from the user equipment and receives the session request sent by the user equipment, determine the association relationship between the obtained media information and the received session request according to the media object identifier of the media information carried in the media announcement message and the media object identifier carried in the session request.

With reference to the fourth possible implementation manner of the second aspect of the present disclosure, in a fifth possible implementation manner, the receiving module is further configured to receive a media control policy sent by a conference application server; and the determining module is configured to determine, according to the media object identifier carried in the media control policy, the media information and the session request that include the media object identifier carried in the media control policy and have the association relationship; and obtain the attribute information of the media object corresponding to the media object identifier carried in the media control policy, from the determined media information, and obtain the session identifier and the channel information that are corresponding to the media object identifier carried in the media control policy, from the determined session request.

With reference to the fourth possible implementation manner of the second aspect of the present disclosure, or with reference to the fifth possible implementation manner of the second aspect of the present disclosure, in a sixth possible implementation manner, the sending module is configured to send the session message and the media configuration message to the user equipment that sends the session identifier; where the session message includes the obtained channel information, the media configuration message includes the obtained attribute information of the media object, and the media operation instruction included in the media control policy is sent using the session message or the media configuration message.

With reference to the possible implementation manner of the second aspect of the present disclosure, with reference to the first possible implementation manner of the second aspect of the present disclosure, with reference to the second possible implementation manner of the second aspect of the present disclosure, with reference to the third possible implementation manner of the second aspect of the present disclosure, with reference to the fourth possible implementation manner of the second aspect of the present disclosure, with reference to the fifth possible implementation manner of the second aspect of the present disclosure, or with reference to the sixth possible implementation manner of the second aspect of the present disclosure, in a seventh possible implementation manner, the media control device further includes a comparison module configured to, after the media information and the session request are obtained, compare the media object identifier carried in the media information with the media object identifier carried in the session request; and establish, when the media object identifier carried in the media information and the media object identifier carried in the session request are the same, a mapping relationship between the session identifier carried in the session request, the media object identifier, the channel information, and the attribute information of the media object corresponding to the media object identifier carried in the media information.

With reference to the possible implementation manner of the second aspect of the present disclosure, with reference to the first possible implementation manner of the second aspect of the present disclosure, with reference to the second possible implementation manner of the second aspect of the present disclosure, with reference to the third possible implementation manner of the second aspect of the present disclosure, with reference to the fourth possible implementation manner of the second aspect of the present disclosure, with reference to the fifth possible implementation manner of the second aspect of the present disclosure, with reference to the sixth possible implementation manner of the second aspect of the present disclosure, or with reference to the seventh possible implementation manner of the second aspect of the present disclosure, in an eighth possible implementation manner, the sending module is further configured to send the obtained media information to a device entity that is configured to present an interface, so that the device entity that is configured to present the interface displays the media object corresponding to the media object identifier carried in the received media information on a control interface.

The present disclosure brings the following beneficial effects.

In the embodiments of the present disclosure, a conference center obtains media information sent from user equipment and receives a session request sent by the user equipment, where the media information carries a media object identifier and attribute information of a media object corresponding to the media object identifier, and the session request carries a session identifier, the media object identifier, and information about a channel that is used to transmit the media object corresponding to the media object identifier; according to a media object identifier carried in a media control policy, attribute information of a media object corresponding to the media object identifier carried in the media control policy is obtained from the media information, and a session identifier and channel information that are corresponding to the media object identifier carried in the media control policy are obtained from the session request; a media operation instruction included in the media control policy, the obtained attribute information of the media object, and the obtained channel information are sent to the user equipment that sends the session identifier, where the media operation instruction is used to instruct the user equipment to operate the received attribute information of the media object and the received channel information; by collecting the media information sent by the user equipment, when the media control policy is obtained, the conference center controls, based on the media object identifier in the media control policy, attribute information and channel information that are of a media object that needs to be controlled, so as to achieve an objective of controlling media of each participant. Centralized control over the media of each participant in a conference scenario is implemented, a currently existing situation that control over media at a whole site is relatively disordered is avoided, and control over the media of each participant in a whole site scenario by the conference center is improved.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

Figure 1:
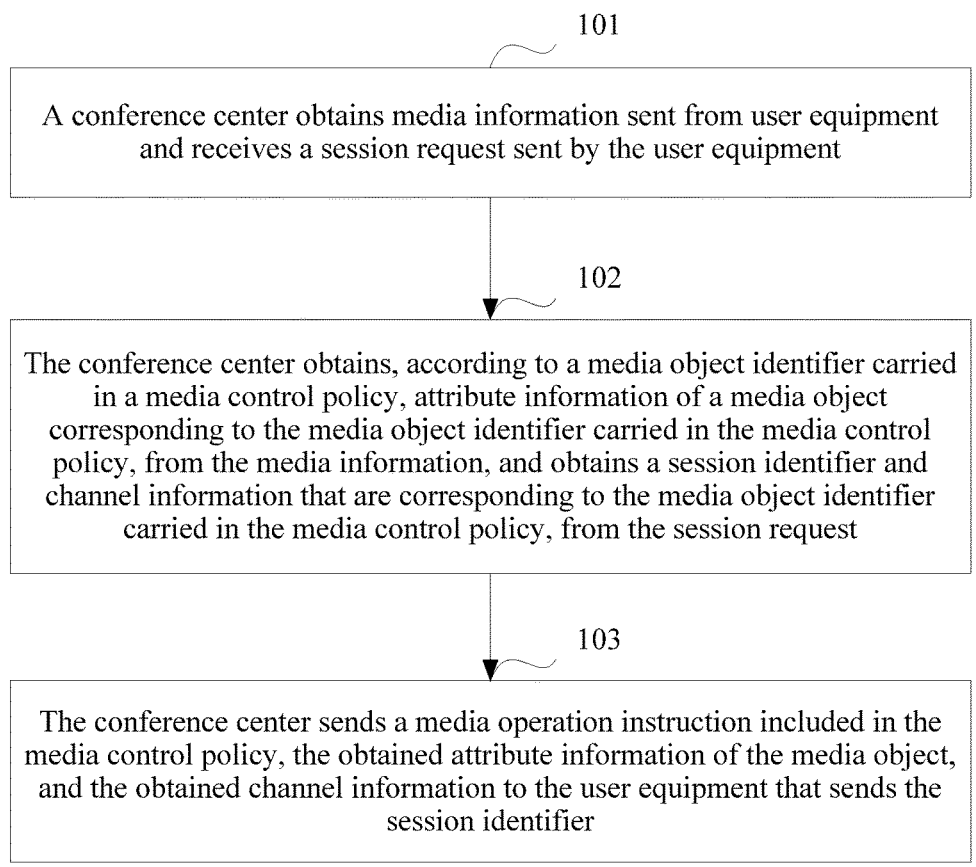
FIG. 1 is a schematic flowchart of a media control method according to Embodiment 1 of the present disclosure.

To achieve an objective of the present disclosure, embodiments of the present disclosure provide a media control method and a media control device. In a conference framework based on an internet protocol (IP) Multimedia Subsystem (IMS), a conference application server, or a network element device that has a media resource function (MRF) is proposed to act as a media control role, that is, a conference center, so as to achieve centralized control over media of each participant in a conference scenario.

When providing a media control function, the conference center at least needs to execute operations in the following aspects.

In one aspect, the conference center obtains media information sent by user equipment corresponding to each participant in the conference scenario, and may further present media content carried in the obtained media information on a device entity that is configured to present an interface (for example, a portal server).

In another aspect, the conference center obtains a media control policy (the media control policy may be locally stored in the conference center, or may be dynamically generated by an upper-layer application according to a site management need), and operates, using a media operation instruction carried in the media control policy, attribute information of a media object corresponding to a media object identifier carried in the media control policy and channel information to achieve an objective of controlling a media object of each participant. Centralized control over the media of each participant in the conference scenario is implemented, a currently existing situation that control over media at a whole site is relatively disordered is avoided, and control over the media of each participant in a whole site scenario by the conference center is improved.

It should be noted that some concepts are involved in the embodiments of the present disclosure, where media information includes a media object, a media object identifier, and attribute information of the media object.

The media object is embodied as a media capture in a media announcement message, and one participant may include multiple media captures. The media object identifier refers to a media capture identifier, for example, Capture 1. The attribute information of the media object refers to an attribute of the media capture, such as location information of the media capture, information about and a type of each participant included in an area captured by the media capture (the information about the participant, such as identity information, communication information, and department information; and the type of the participant, such as a conference chairperson, a conference vice-chairperson, a conference speaker, and a conference recorder), information about a site (geographic information of the site, such as an office area in a city, and site conference information, such as a theme of this conference), and a media codec capability set corresponding to the media capture (a codec set supported by the media capture, such as G711/G729/H264 and a maximum set of bandwidth).

The media information includes at least one media object, that is, the media capture.

The media information is added into the media announcement message and is sent to the conference center.

Some concepts are also involved in the embodiments of the present disclosure. A session request includes a session identifier, a media object identifier, and information about a channel that is used to transmit the media object corresponding to the media object identifier.

The session identifier is used to represent the session request sent by the user equipment, and the media object identifier included in the session request and the media object identifier included in the media information may be completely the same, partially the same, or different.

For the media information and the session request sent by same user equipment, the media object identifier included in the session request and the media object identifier included in the media information may be completely the same or partially the same.

For the media information and the session request sent by different user equipments, the media object identifier included in the session request and the media object identifier included in the media information may be different.

If the session request is transmitted using a Session Initiation Protocol (SIP) message, the SIP message includes Session Description Protocol (SDP) content. In an m line in the SDP content, the media object identifier and the information about the channel that is used to transmit the media object corresponding to the media object identifier are described, and the channel information can be obtained by means of negotiation between two participants involved in communication.

The channel information may refer to information about a port and an address of a transmission channel, a media object type (audio, video, or the like), a receive-transmit mode for the media object (receive-only, transmit-only, two-way receive and transmit, and inactivated), a codec, bandwidth, or the like.

The following further describes the embodiments of the present disclosure in detail with reference to the accompanying drawings in the specification. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Embodiment 1

As shown in FIG. 1, a schematic flowchart of a media control method is provided in Embodiment 1 of the present disclosure. The method may be described in the following steps.

Step 101: A conference center obtains media information sent from user equipment and receives a session request sent by the user equipment.

The media information carries a media object identifier and attribute information of a media object corresponding to the media object identifier. The session request carries a session identifier, the media object identifier, and information about a channel that is used to transmit the media object corresponding to the media object identifier.

Optionally, the media information may further carry the session identifier of the session request sent by the user equipment.

In step 101, the conference center receives session requests sent by at least two user equipments.

In a telepresence site, user equipment of each participant sends a session request to the conference center, where the session request is used to represent that the user equipment of each participant requests to join a conference.

The user equipment sends the session request to the conference center using a signaling path.

The session request may be a SIP INVITE (access request) message.

When allowing the user equipment that sends the session request to join the conference, the conference center returns a session response message (for example, a SIP 183 message) to the user equipment, and establishes, between the conference center and the user equipment according to channel information carried in the session request, a media-plane data transmission channel (for example, a CLUE Data Channel) that is used to transmit the media object.

The conference center receives media announcement messages sent by at least two user equipments, where each media announcement message includes the media information of the user equipment.

A conference server receives, using the established media-plane data transmission channel, the media announcement messages sent by the at least two user equipments.

When obtaining the media information and the session request, the conference center compares the media object identifier carried in the media information with the media object identifier carried in the session request.

When the media object identifier carried in the media information and the media object identifier carried in the session request are the same, a mapping relationship between the session identifier carried in the session request, the media object identifier, the information about the channel that is used to transmit the media object corresponding to the media object identifier, and the attribute information of the media object corresponding to the media object identifier carried in the media information is established.

Optionally, when the media information sent by the user equipment is obtained, the media information is sent to a device entity that is configured to present an interface, so that the device entity that is configured to present the interface displays the media object corresponding to the media object identifier carried in the received media information on a control interface.

It should be noted that the device entity that is configured to present the interface may be a portal server, where the portal server may be a web portal server or a user portal server of the user equipment, which is not limited herein.

Step 102: The conference center obtains, according to a media object identifier carried in a media control policy, attribute information of a media object corresponding to the media object identifier carried in the media control policy, from the media information, and obtains a session identifier and channel information that are corresponding to the media object identifier carried in the media control policy, from the session request.

In step 102, the conference center may obtain the media control policy from a media control policy set that is locally stored, or may further receive a media control policy sent by an upper-layer application.

It should be noted that the media control policy may be locally stored in the conference center, may be dynamically delivered by the upper-layer application according to an actual site management need, or may be generated, according to a need, by the device entity that is configured to present the interface and that is deployed at a user equipment end, which is not limited herein.

The media control policy includes the media object identifier, which is used to represent a media object that is corresponding to the media object identifier and whose attribute information and/or channel information is controlled by a media operation instruction.

When obtaining the media control policy, the conference center executes the following operations according to the media information obtained and the session request received in step 101: searching, according to the media object identifier carried in the media control policy, the media information for media information that carries a media object identifier that is the same as the media object identifier carried in the media control policy, and obtaining, from the found media information, the attribute information of the media object corresponding to the media object identifier carried in the media control policy; and searching, according to the media object identifier carried in the media control policy, the session request for a session request that carries a media object identifier that is the same as the media object identifier carried in the media control policy, and obtaining, from the found session request, the session identifier and the channel information that are corresponding to the media object identifier carried in the media control policy.

It should be noted that if the media control policy does not include the media object identifier, it means that a same media operation instruction needs to be executed for the attribute information of the media object corresponding to the media object identifier carried in all the media information obtained by the conference center, and/or a same media operation instruction needs to be executed for the channel information corresponding to the media object identifier carried in all the session requests received by the conference center.

Step 103: The conference center sends a media operation instruction included in the media control policy, the obtained attribute information of the media object, and the obtained channel information to the user equipment that sends the session identifier.

The media operation instruction is used to instruct the user equipment to operate the received attribute information of the media object and the received channel information.

In step 103, the media control policy includes the media operation instruction, such as controlling silence/mute for the media object, controlling handover/prohibition of handover between different media objects at a site, or controlling a presence mode for the media object at a site: a fixed mode or a browsing mode, or the like.

A relationship between the media operation instruction and the media object identifier may be that one media operation instruction corresponds to multiple media object identifiers, or may be that one media operation instruction corresponds to one media object identifier. The relationship between the media operation instruction and the media object identifier is not specifically limited herein.

The conference center sends a session message to the user equipment that sends the session identifier, where the session message carries the obtained channel information. For example, the session message may be a session re-INVITE message (re-INVITE).

It should be noted that the channel information may refer to information about a port and an address for a transmission channel, a media object type (audio, video, or the like), a codec, bandwidth, or the like.

The conference center sends a media configuration message to the user equipment that sends the session identifier, where the media configuration message carries the obtained attribute information of the media object.

It should be noted that the attribute information may refer to a location relationship of the media object, information about and a type of a participant, information about a site, a codec capability set supported by the media object or a simultaneous transmission set of the media object, or the like.

The media operation instruction included in the media control policy is sent using the session message or the media configuration message.

According to the solution in Embodiment 1 of the present disclosure, by collecting media information sent by user equipment, when a media control policy is obtained, a conference center controls, based on a media object identifier in the media control policy, attribute information and channel information that are of a media object that needs to be controlled, so as to achieve an objective of controlling media of each participant. Centralized control over the media of each participant in a conference scenario is implemented, a currently existing situation that control over media content at a whole site is relatively disordered is avoided, and control over the media of each participant in a whole site scenario by the conference center is improved.

Embodiment 2

Figure 2:
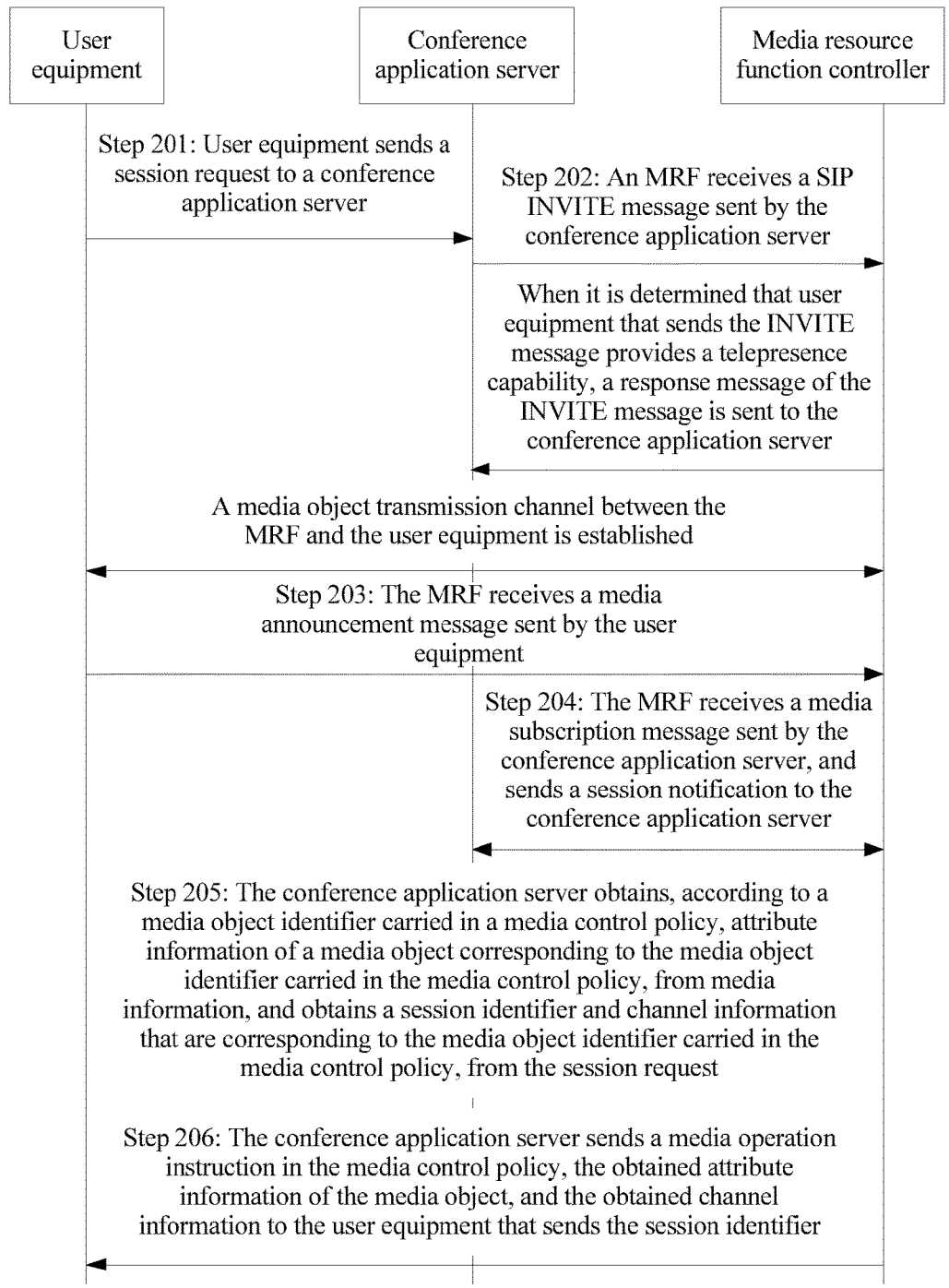
FIG. 2 is a schematic flowchart of a media control method according to Embodiment 2 of the present disclosure.

As shown in FIG. 2, a schematic flowchart of a media control method is provided in Embodiment 2 of the present disclosure. In Embodiment 2 of the present disclosure, that a conference center is a conference application server is used as an example for description. The method may be described as in the following steps.

Step 201: User equipment sends a session request to a conference application server.

The session request carries a session identifier, a media object identifier, and information about a channel that is used to transmit a media object corresponding to the media object identifier.

In step 201, at a telepresence site, user equipment of each participant sends a session request to the conference application server, where the session request is used to represent that the user equipment of each participant requests to join a conference.

The user equipment sends the session request to the conference application server using a signaling path.

The session request may be a SIP INVITE message.

When allowing the user equipment that sends the session request to join the conference, the conference application server returns a session response message (for example, a SIP 183 message) to the user equipment, and establishes, between the conference application server and the user equipment according to channel information carried in the session request, a media-plane data transmission channel (for example, a CLUE Data Channel) that is used to transmit the media object.

The SIP INVITE message carries an identifier indicating whether a telepresence capability is provided. The identifier indicating whether the telepresence capability is provided may be a sip.clue parameter, where the sip.clue indicates whether the user equipment provides the telepresence capability.

It should be noted that the telepresence capability refers to a high-end application capability in a remote video communication field. The capability can provide user equipment with life-size, face-to-face, and eye-to-eye video communication, and creates a real feeling that participants in remote locations gather in a conference room.

In Embodiment 2 of the present disclosure, the conference application server provides a media control function. When receiving the INVITE message sent by the user equipment, the conference application server adds identifier information used to indicate that the media control function is provided, into the INVITE message, and sends the INVITE message to an MRF device.

The identifier information used to indicate that the media control function is provided may be "Supported: ASconf-control" field information or other information, which is not limited herein.

Step 202: After receiving an INVITE message sent by the conference application server and when determining that user equipment that sends the INVITE message provides a telepresence capability, an MRF sends a response message of the INVITE message to the conference application server to establish a media object transmission channel between the MRF and the user equipment.

In step 202, after receiving the INVITE message sent by the conference application server and recognizing that the conference application server provides a media content control function, the MRF determines, according to a sip.clue parameter carried in the INVITE message, whether the user equipment that sends the INVITE message provides the telepresence capability.

When determining that the user equipment that sends the SIP INVITE message provides the telepresence capability, the MRF returns a SIP 183 message to the conference application server.

In addition, the MRF establishes the media object transmission channel between the MRF and the user equipment.

Step 203: The MRF receives a media announcement message sent by the user equipment.

The media announcement message includes media information.

Optionally, the media announcement message may further include the session identifier of the session request sent by the user equipment that sends the media announcement message.

In step 203, the MRF receives, using the established media object transmission channel, the media announcement message sent by the user equipment.

In addition, the MRF receives the session request sent by the user equipment. The session request carries the session identifier and the media object identifier.

The MRF determines, according to the received media announcement message and session request, an association relationship between the media information carried in the media announcement message and the session request. Specific manners include but are not limited to the following.

A First Manner:

If the media announcement message that is received by the MRF and that is sent by the user equipment carries the session identifier, the session identifier carried in the media announcement message is compared with the session identifier carried in the received session request.

When the session identifier carried in the media announcement message and the session identifier carried in the received session request are the same, the association relationship between the media information carried in the media announcement message and the received session request is determined.

A Second Manner:

If the session request that is received by the MRF and that is sent by the user equipment carries the media object identifier, the media object identifier included in the media information carried in the media announcement message is compared with the media object identifier included in the received session request.

When the media object identifier included in the media information carried in the media announcement message and the media object identifier carried in the received session request are the same, the association relationship between the media information carried in the media announcement message and the received session request is determined.

Step 204: The MRF receives a media subscription message sent by the conference application server, and sends a session notification to the conference application server.

The session notification carries media information and a session identifier of a session request that has an association relationship with the media information, where the media information is obtained by the MRF from the media announcement message sent by the user equipment.

In step 204, the media subscription message may be represented as a SIP SUBSCRIBE/NOTIFY message.

Optionally, after receiving the session request sent by the user equipment, the conference application server determines the association relationship between the session request received in step 201 and the received media information according to the session identifier carried in the session request received in step 201 and the session identifier carried in the received session notification.

Step 205: The conference application server obtains, according to a media object identifier carried in a media control policy, attribute information of a media object corresponding to the media object identifier carried in the media control policy, from the media information, and obtains a session identifier and channel information that are corresponding to the media object identifier carried in the media control policy, from the session request.

In step 205, the media control policy includes a media operation instruction, such as controlling silence/mute for the media object, controlling handover/prohibition of handover between different media objects at a site, or controlling a presence mode for the media object at a site: a fixed mode or a browsing mode, or the like.

The conference application server may obtain the media control policy from a media control policy set that is locally stored, or may further receive a media control policy sent by an upper-layer application. A manner of obtaining the media control policy by the conference application server is not specifically limited herein.

It should be noted that the media control policy may be locally stored in the conference application server, may be dynamically delivered by the upper-layer application according to an actual site management need, or may be generated, according to a need, by a device entity that is configured to present an interface and that is deployed at a user equipment end, which is not limited herein.

The media control policy includes the media object identifier, which is used to represent a media object that is corresponding to the media object identifier and whose attribute information and/or channel information is controlled by a media operation instruction.

When obtaining the media control policy, the conference application server executes the following operations: searching, according to the media object identifier carried in the media control policy, the received media information for media information that carries a media object identifier that is the same as the media object identifier carried in the media control policy, and obtaining, from the found media information, the attribute information of the media object corresponding to the media object identifier carried in the media control policy; and searching, according to the media object identifier carried in the media control policy, the received session request for a session request that carries a media object identifier that is the same as the media object identifier carried in the media control policy, and obtaining, from the found session request, the session identifier and the channel information that are corresponding to the media object identifier carried in the media control policy.

It should be noted that if the media control policy does not include the media object identifier, it means that a same media operation instruction needs to be executed for the attribute information of the media object corresponding to the media object identifier carried in all the media information obtained by the conference center, and/or a same media operation instruction needs to be executed for the channel information corresponding to the media object identifier carried in all the session requests received by the conference center.

Step 206: The conference application server sends a media operation instruction in the media control policy, the obtained attribute information of the media object, and the obtained channel information to the user equipment that sends the session identifier.

In step 206, the conference application server sends the session message to the user equipment that sends the session identifier, where the session message carries the media operation instruction and the obtained channel information.

The conference application server sends the obtained attribute information of the media object and the obtained session identifier to the MRF, and instructs the MRF to send the media configuration message to the user equipment that sends the obtained session identifier. The media configuration message carries the obtained attribute information of the media object.

For example, the media operation instruction carried in the media control policy instructs user equipment (UE) 1 to receive only a media object of UE 2. Then, the UE 1 receives, after receiving the media operation instruction sent by the conference application server, the media object of the UE 2 using the received channel information.

For example, the media operation instruction carried in the media control policy instructs UE 3 to exit from the conference. Then, the UE 3 disconnects, after receiving the media operation instruction sent by the conference application server, communication with the conference application server and the MRF.

By collecting media information sent by user equipment, when a media control policy is obtained, a conference application server controls, based on a media object identifier in the media control policy, attribute information and channel information that are of a media object that needs to be controlled, so as to achieve an objective of controlling media of each participant. Centralized control over the media of each participant in a conference scenario is implemented, a currently existing situation that control over media content at a whole site is relatively disordered is avoided, and control over the media of each participant in a whole site scenario by the conference center is improved.

Embodiment 3

Figure 3:
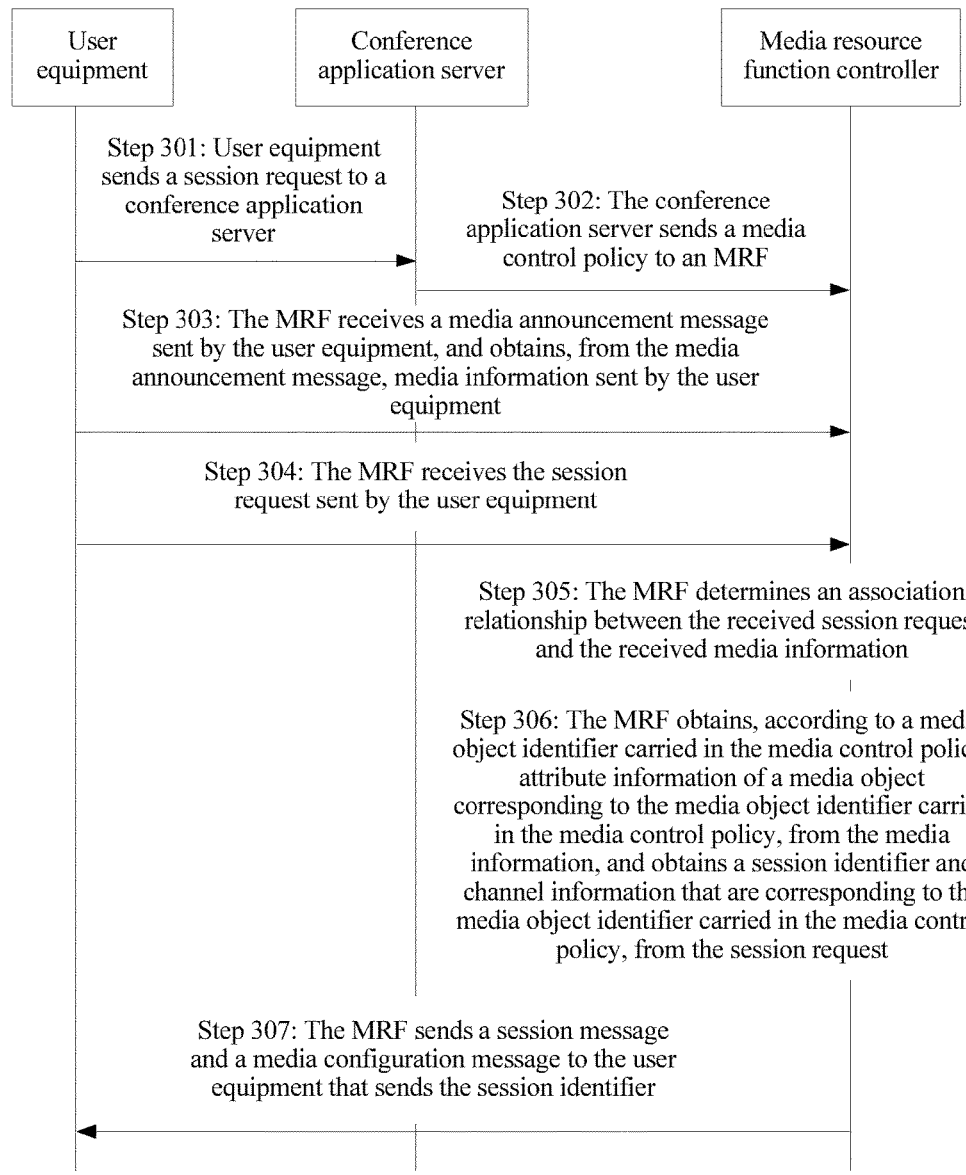
FIG. 3 is a schematic flowchart of a media control method according to Embodiment 3 of the present disclosure.

As shown in FIG. 3, a schematic flowchart of a media control method is provided in Embodiment 3 of the present disclosure. In Embodiment 3 of the present disclosure, that a conference center is an MRF is used as an example for description. The method may be described as in the following steps.

Step 301: User equipment sends a session request to a conference application server.

The session request carries a session identifier, a media object identifier, and information about a channel that is used to transmit a media object corresponding to the media object identifier.

In step 301, the conference application server receives the session request sent by the user equipment.

In a telepresence site, user equipment of each participant sends a session request to the conference application server, where the session request is used to represent that the user equipment of each participant requests to join a conference.

The user equipment sends the session request to the conference application server using a signaling path.

The session request may be a SIP INVITE message.

When allowing the user equipment that sends the session request to join the conference, the conference center returns a session response message (for example, a SIP 183 message) to the user equipment.

Step 302: The conference application server sends a media control policy to the MRF.

In step 302, the conference application server may obtain the media control policy from a media control policy set that is locally stored, or may further receive a media control policy sent by an upper-layer application. A manner of obtaining the media control policy by the conference application server is not specifically limited herein.

It should be noted that the media control policy may be locally stored in the conference application server, may be dynamically delivered by the upper-layer application according to an actual site management need, or may be generated, according to a need, by a device entity that is configured to present an interface and that is deployed at a user equipment end, which is not limited herein.

The media control policy includes a media object identifier, which is used to represent a media object that is corresponding to the media object identifier and whose attribute information and/or channel information is controlled by a media operation instruction.

The media control policy includes the media operation instruction, such as controlling silence/mute for the media object, controlling handover/prohibition of handover between different media objects at a site, or controlling a presence mode for the media object at a site: a fixed mode or a browsing mode, or the like.

Step 303: The MRF receives a media announcement message sent by the user equipment, and obtains, from the media announcement message, media information sent by the user equipment.

The media announcement message carries the media information.

The media information carries a media object identifier and attribute information of a media object corresponding to the media object identifier.

Step 304: The MRF receives the session request sent by the user equipment.

The session request carries the session identifier, the media object identifier, and the information about the channel that is used to transmit the media object corresponding to the media object identifier.

Step 305: The MRF determines an association relationship between the received session request and the received media information.

In step 305, after obtaining the media information from the user equipment and receiving the session request sent by the user equipment, the MRF determines, the association relationship between the obtained media information and the received session request according to the media object identifier carried in the media information and the media object identifier carried in the session request.

Step 306: The MRF obtains, according to a media object identifier carried in the media control policy, attribute information of a media object corresponding to the media object identifier carried in the media control policy, from the media information, and obtains a session identifier and channel information that are corresponding to the media object identifier carried in the media control policy, from the session request.

In step 306, the MRF determines, according to the media object identifier carried in the media control policy, the media information and the session request that include the media object identifier carried in the media control policy and have the association relationship.

The attribute information of the media object corresponding to the media object identifier carried in the media control policy is obtained from the determined media information. The session identifier and the channel information that are corresponding to the media object identifier carried in the media control policy are obtained from the determined session request.

Step 307: The MRF sends a session message and a media configuration message to the user equipment that sends the obtained session identifier carried in the session request.

The session message includes the obtained channel information. The media configuration message includes the obtained attribute information of the media object. The media operation instruction carried in the media control policy is sent using the session message or the media configuration message.

By collecting media information sent by user equipment, when a media control policy is obtained, an MRF controls, based on a media object identifier in the media control policy, attribute information and channel information that are of a media object that is corresponding to the media object identifier and that needs to be controlled, so as to achieve an objective of controlling media of each participant. Centralized control over media content of each participant in a conference scenario is implemented, a currently existing situation that control over the media at a whole site is relatively disordered is avoided, and control over the media of each participant in a whole site scenario by the conference center is improved.

Embodiment 4

Figure 4:
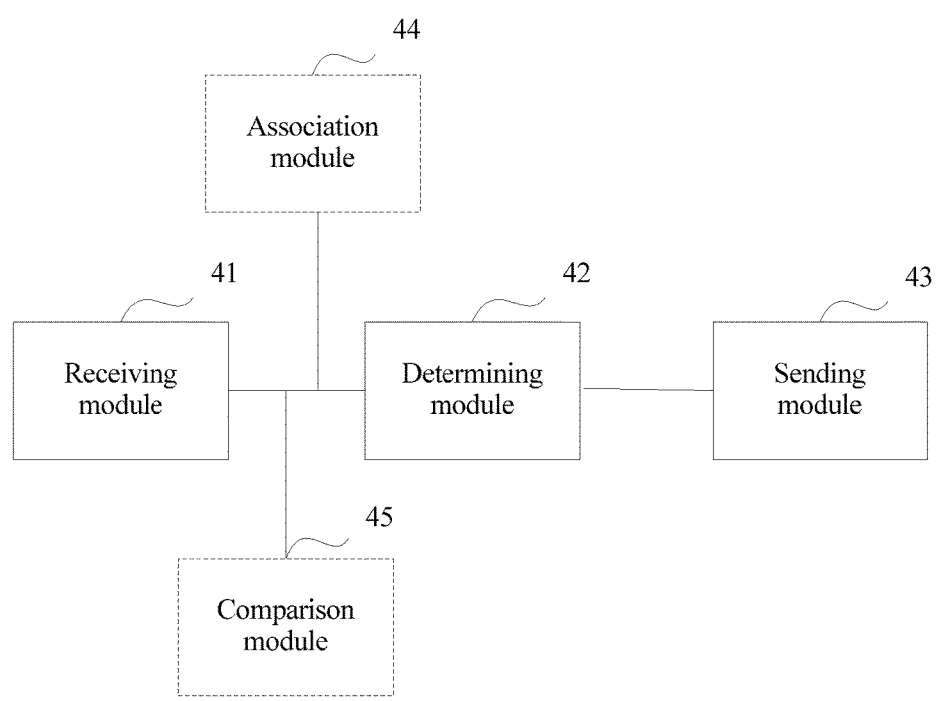
FIG. 4 is a schematic structural diagram of a media control device according to Embodiment 4 of the present disclosure.

As shown in FIG. 4, a schematic structural diagram of a media control device is provided in Embodiment 4 of the present disclosure. The media control device includes a receiving module 41, a determining module 42, and a sending module 43.

The receiving module 41 is configured to obtain media information sent from user equipment, and receive a session request sent by the user equipment, where the media information carries a media object identifier and attribute information of a media object corresponding to the media object identifier, and the session request carries a session identifier, the media object identifier, and information about a channel that is used to transmit the media object corresponding to the media object identifier.

The determining module 42 is configured to obtain, according to a media object identifier carried in a media control policy, attribute information of a media object corresponding to the media object identifier carried in the media control policy, from the media information obtained by the receiving module, and obtain a session identifier and channel information that are corresponding to the media object identifier carried in the media control policy, from the session request received by the receiving module.

The sending module 43 is configured to send a media operation instruction included in the media control policy, the obtained attribute information of the media object, and the obtained channel information to the user equipment that sends the session identifier, where the media operation instruction is used to instruct the user equipment to operate the received attribute information of the media object and the received channel information.

The sending module 43 is configured to send a session message to the user equipment that sends the session identifier, where the session message carries the obtained channel information; and send a media configuration message to the user equipment that sends the session identifier, where the media configuration message carries the obtained attribute information of the media object; where the media operation instruction included in the media control policy is sent using the session message or the media configuration message.

Preferably, if the media control device is a conference application server, the receiving module 41 is configured to receive a session notification sent by a network element device and receive the session request sent by the user equipment, where the session notification carries media information and a session identifier of a session request that has an association relationship with the media information, the media information is obtained by the network element device from a media announcement message sent by the user equipment, and the network element device provides a media resource function.

The association relationship between the media information and the session request is determined by the network element device according to the media object identifier carried in the received session request sent by the user equipment and a media object identifier carried in the received media announcement message sent by the user equipment.

Preferably, the media control device further includes an association module 44.

The association module 44 is configured to, when the receiving module receives the session request sent by the user equipment, determine the association relationship between the received session request and the received media information according to the session identifier carried in the session request and the session identifier carried in the received session notification.

The sending module 43 is configured to send the session message to the user equipment that sends the session identifier, where the session message carries the media operation instruction and the obtained channel information; and send the obtained attribute information of the media object and the obtained session identifier to the network element device, and instruct the network element device to send the media configuration message to the user equipment that sends the obtained session identifier, where the media configuration message carries the obtained attribute information of the media object.

Preferably, if the media control device is a network element device that provides a media resource function, the receiving module 41 is configured to receive a media announcement message sent by the user equipment, receive the session request sent by the user equipment, and obtain the media information sent by the user equipment from the media announcement message, where the media announcement message carries the media information.

The association module 44 is configured to, when the receiving module obtains the media information from the user equipment and receives the session request sent by the user equipment, determine the association relationship between the obtained media information and the received session request according to the media object identifier of the media information carried in the media announcement message and the media object identifier carried in the session request.

The receiving module 41 is further configured to receive a media control policy sent by a conference application server.

The determining module 42 is configured to determine, according to a media object identifier carried in the media control policy, the media information and the session request that include the media object identifier carried in the media control policy and have the association relationship; and obtain attribute information of a media object corresponding to the media object identifier carried in the media control policy, from the determined media information, and obtain a session identifier and channel information that are corresponding to the media object identifier carried in the media control policy, from the determined session request.

The sending module 43 is configured to send the session message and the media configuration message to the user equipment that sends the session identifier.

The session message includes the obtained channel information. The media configuration message includes the obtained attribute information of the media object. The media operation instruction included in the media control policy is sent using the session message or the media configuration message.

Preferably, the media control device further includes a comparison module 45.

The comparison module 45 is configured to compare, after the media information and the session request are obtained, the media object identifier carried in the media information with the media object identifier carried in the session request; and establish, when the media object identifier carried in the media information and the media object identifier carried in the session request are the same, a mapping relationship between the session identifier carried in the session request, the media object identifier, the channel information, and the attribute information of the media object corresponding to the media object identifier carried in the media information.

The sending module 43 is further configured to send the obtained media information to a device entity that is configured to present an interface, so that the device entity that is configured to present the interface displays the media object corresponding to the media object identifier carried in the received media information on a control interface.

It should be noted that, in this embodiment of the present disclosure, the media control device may be implemented by software, or may be implemented by hardware, and may be implemented as a conference center. An implementation manner of the media control device is not specifically limited herein.

By collecting media information sent by user equipment, when a media control policy is obtained, a media control device controls, based on a media object identifier in the media control policy, attribute information and channel information that are of a media object that is corresponding to the media object identifier and that needs to be controlled, so as to achieve an objective of controlling media of each participant. Centralized control over media content of each participant in a conference scenario is implemented, a currently existing situation that control over the media at a whole site is relatively disordered is avoided, and control over the media of each participant in a whole site scenario by the conference center is improved.

Embodiment 5

Figure 5:
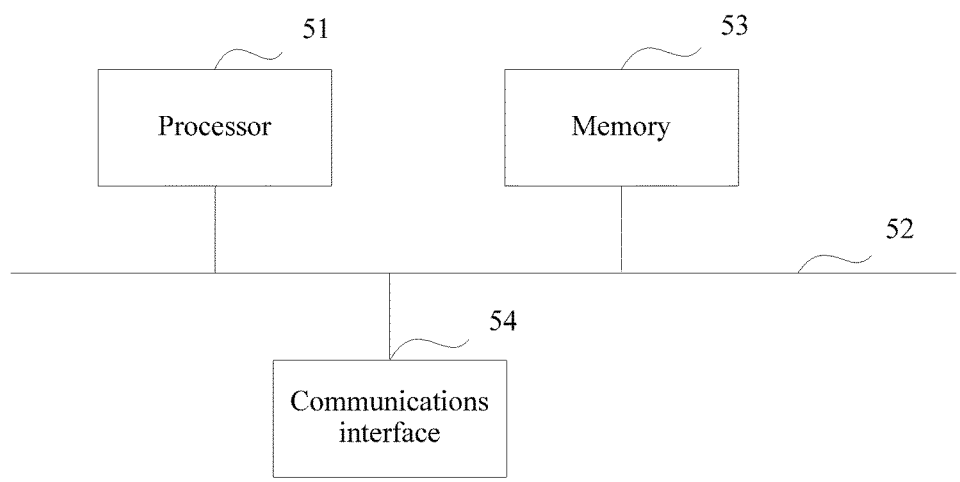
FIG. 5 is a schematic structural diagram of a media control device according to Embodiment 5 of the present disclosure.

As shown in FIG. 5, a schematic structural diagram of a media control device is provided in Embodiment 5 of the present disclosure. The media control device provides a function of executing Embodiment 1 of the present disclosure to Embodiment 3 of the present disclosure. The media control device may use a general architecture of a computer system, and the computer system may be a processor-based computer. The media control device includes at least one processor 51, a communications bus 52, a memory 53, and at least one communications interface 54.

The processor 51 may be a general-purpose central processing unit (CPU), a microprocessor, an application-specific integrated circuit (ASIC), or one or more integrated circuits configured to control program execution of the solutions in the present disclosure.

The communications bus 52 may include a path used to transfer information between the foregoing components. The communications interface 54 may be any apparatus like a transceiver, and is configured to communicate with another device or communications network, such as an Ethernet network, a radio access network (RAN), or a wireless local area network (WLAN).

The computer system includes one or more memories 53. The memory may be a read-only memory (ROM) or another type of static storage device that may store static information and instructions, a random access memory (RAM) or another type of dynamic storage device that may store information and instructions; or may also be an electrically erasable programmable read-only memory (EEPROM), a compact disc read-only memory (CD-ROM), another compact disc storage medium, an optical disc storage medium (including a compact disc, a laser disc, an optical disc, a digital versatile disc, a Blu-ray disc, or the like), a magnetic disk storage medium, another magnetic storage device, or any other medium that can be configured to carry or store expected program code that has an instruction or digital structure form and that can be accessed by a computer. However, a form of the memory is not limited herein. The memories are connected to the processor by the bus.

The memory 53 is configured to store application program code used to execute solutions of the present disclosure, where the application program code used to execute the solutions of the present disclosure is saved in the memory, and the execution is controlled by the processor 51. The processor 51 is configured to execute an application program stored in the memory 53.

In a possible implementation manner, when being executed by the processor 51, the foregoing application program implements the following functions: obtaining media information sent from user equipment, and receiving a session request sent by the user equipment, where the media information carries a media object identifier and attribute information of a media object corresponding to the media object identifier, and the session request carries a session identifier, the media object identifier, and information about a channel that is used to transmit the media object corresponding to the media object identifier; obtaining, according to a media object identifier carried in a media control policy, attribute information of a media object corresponding to the media object identifier carried in the media control policy, from the media information, and obtaining a session identifier and channel information that are corresponding to the media object identifier carried in the media control policy, from the session request; and sending a media operation instruction included in the media control policy, the obtained attribute information of the media object, and the obtained channel information to the user equipment that sends the session identifier, where the media operation instruction is used to instruct the user equipment to operate the received attribute information of the media object and the received channel information.

In a possible implementation manner, when sending the media operation instruction carried in the media control policy, the obtained attribute information of the media object, and the obtained channel information to the user equipment that sends the session identifier, the processor 51 executes sending a session message to the user equipment that sends the session identifier, where the session message carries the obtained channel information; and sending a media configuration message to the user equipment that sends the session identifier, where the media configuration message carries the obtained attribute information of the media object; where the media operation instruction included in the media control policy is sent using the session message or the media configuration message.

In a possible implementation manner, when obtaining the media information sent from the user equipment, the processor 51 executes receiving a session notification sent by a network element device, where the session notification carries media information and a session identifier of a session request that has an association relationship with the media information, the media information is obtained by the network element device from a media announcement message sent by the user equipment, and the network element device provides a media resource function; where the association relationship between the media information and the session request is determined by the network element device according to the media object identifier carried in the received session request sent by the user equipment and a media object identifier carried in the received media announcement message sent by the user equipment; and when the session request sent by the user equipment is received, determining the association relationship between the received session request and the received media information according to the session identifier carried in the session request and the session identifier carried in the received session notification.

In a possible implementation manner, when sending the media operation instruction included in the media control policy, the obtained attribute information of the media object, and the obtained channel information to the user equipment that sends the session identifier, the processor 51 executes sending the session message to the user equipment that sends the session identifier, where the session message carries the media operation instruction and the obtained channel information; and sending the obtained attribute information of the media object and the obtained session identifier to the network element device, and instructing the network element device to send the media configuration message to the user equipment that sends the obtained session identifier, where the media configuration message carries the obtained attribute information of the media object.

In a possible implementation manner, if the media control device is a network element device that provides a media resource function, when obtaining the media information sent from the user equipment, the processor 51 executes receiving a media announcement message sent by the user equipment, and obtaining the media information sent by the user equipment from the media announcement message, where the media announcement message carries the media information; and when the media information from the user equipment is obtained and the session request sent by the user equipment is received, determining an association relationship between the obtained media information and the received session request according to the media object identifier of the media information carried in the media announcement message and the media object identifier carried in the session request.

In a possible implementation manner, the processor 51 is further configured to execute receiving a media control policy sent by a conference application server; and obtaining, according to a media object identifier carried in the media control policy, attribute information of a media object corresponding to the media object identifier carried in the media control policy, from the media information, and obtaining a session identifier and channel information that are corresponding to the media object identifier carried in the media control policy, from the session request, including determining, according to the media object identifier carried in the media control policy, the media information and the session request that include the media object identifier carried in the media control policy and have the association relationship; and obtaining the attribute information of the media object corresponding to the media object identifier carried in the media control policy, from the determined media information, and obtaining the session identifier and the channel information that are corresponding to the media object identifier carried in the media control policy, from the determined session request.

In a possible implementation manner, when sending the media operation instruction included in the media control policy, the obtained attribute information of the media object, and the obtained channel information to the user equipment that sends the session identifier, the processor 51 executes sending, by the network element device, the session message and the media configuration message to the user equipment that sends the session identifier; where the session message includes the obtained channel information, the media configuration message includes the obtained attribute information of the media object, and the media operation instruction included in the media control policy is sent using the session message or the media configuration message.

In a possible implementation manner, the processor 51 is further configured to execute comparing, after the media information and the session request are obtained, the media object identifier carried in the media information with the media object identifier carried in the session request; and establishing, when the media object identifier carried in the media information and the media object identifier carried in the session request are the same, a mapping relationship between the session identifier carried in the session request, the media object identifier, the channel information, and the attribute information of the media object corresponding to the media object identifier carried in the media information.

In a possible implementation manner, the processor 51 is further configured to execute sending the obtained media information to a device entity that is configured to present an interface, so that the device entity that is configured to present the interface displays the media object corresponding to the media object identifier carried in the received media information on a control interface.

In this embodiment, when the application program is executed by the processor, for processing performed by the media control device and a method of interaction between the media control device and another network element, refer to the foregoing method embodiments. Details are not described herein again.

By collecting media information sent by user equipment, when a media control policy is obtained, a media control device provided in this embodiment controls, based on a media object identifier in the media control policy, attribute information and channel information that are of a media object that is corresponding to the media object identifier and that needs to be controlled, so as to achieve an objective of controlling media of each participant. Centralized control over media content of each participant in a conference scenario is implemented, a currently existing situation that control over the media at a whole site is relatively disordered is avoided, and control over the media of each participant in a whole site scenario by the conference center is improved.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, or the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A media control method, comprising:
   obtaining, by a conference center, media information sent from user equipment;
   receiving a session request from the user equipment, wherein the media information carries a media object identifier and attribute information of a media object corresponding to the media object identifier, and wherein the session request carries a session identifier, the media object identifier, and information about a channel used to transmit the media object corresponding to the media object identifier;
   obtaining, by the conference center according to a media object identifier carried in a media control policy, attribute information of a media object corresponding to the media object identifier carried in the media control policy, from the media information; and
   obtaining a session identifier and channel information that are corresponding to the media object identifier carried in the media control policy, from the session request;

sending, by the conference center, a media operation instruction comprised in the media control policy, the obtained attribute information of the media object, and the obtained channel information to the user equipment that sends the session identifier, wherein the media operation instruction is used to instruct the user equipment to operate the received attribute information of the media object and the received channel information; and establishing, by the conference center, a data transmission channel with the user equipment according to the channel information.

2. The media control method according to claim 1, wherein sending, by the conference center, the media operation instruction comprised in the media control policy, the obtained attribute information of the media object, and the obtained channel information to the user equipment that sends the session identifier comprises:

sending, by the conference center, a session message to the user equipment that sends the session identifier, wherein the session message carries the obtained channel information; and sending, by the conference center, a media configuration message to the user equipment that sends the session identifier, wherein the media configuration message carries the obtained attribute information of the media object, and wherein the media operation instruction comprised in the media control policy is sent using the session message or the media configuration message.

3. The media control method according to claim 1, wherein when the conference center is a conference application server, obtaining, by the conference center, the media information sent from the user equipment comprises receiving, by the conference application server, a session notification from a network element device, wherein the session notification carries media information and a session identifier of a session request that has an association relationship with the media information, wherein the media information is obtained by the network element device from a media announcement message in from the user equipment, wherein the network element device provides a media resource function, wherein the association relationship between the media information and the session request is determined by the network element device according to the media object identifier carried in the received session request from the user equipment and a media object identifier carried in the received media announcement message from the user equipment, and wherein the method further comprises determining, by the conference application server after receiving the session request from the user equipment, the association relationship between the received session request and the received media information according to the session identifier carried in the session request and the session identifier carried in the received session notification.

4. The media control method according to claim 3, wherein sending, by the conference center, the media operation instruction comprised in the media control policy, the obtained attribute information of the media object, and the obtained channel information to the user equipment that sends the session identifier comprises:

sending, by the conference application server, a session message to the user equipment that sends the session identifier, wherein the session message carries the media operation instruction and the obtained channel information;

sending, by the conference application server, the obtained attribute information of the media object and the obtained session identifier to the network element device; and instructing the network element device to send a media configuration message to the user equipment that sends the session identifier, wherein the media configuration message carries the obtained attribute information of the media object.

5. The media control method according to claim 1, wherein when the conference center is a network element device that provides a media resource function, obtaining, by the conference center, the media information sent from user equipment comprises:

receiving, by the network element device, a media announcement message from the user equipment; and obtaining, from the media announcement message, the media information from the user equipment, wherein the media announcement message carries the media information, and wherein the method further comprises determining, by the network element device after obtaining the media information from the user equipment and receiving the session request from the user equipment, an association relationship between the obtained media information and the received session request according to the media object identifier of the media information carried in the media announcement message and the media object identifier carried in the session request.

6. The media control method according to claim 5, further comprising:

receiving, by the network element device, a media control policy from a conference application server;

obtaining, by the network element device according to the media object identifier carried in the media control policy, the attribute information of the media object corresponding to the media object identifier carried in the media control policy, from the media information; and obtaining the session identifier and the channel information that are corresponding to the media object identifier carried in the media control policy, from the session request, comprising:

determining, by the network element device according to the media object identifier carried in the media control policy, the media information and the session request that comprise the media object identifier carried in the media control policy and have the association relationship;

obtaining the attribute information of the media object corresponding to the media object identifier carried in the media control policy, from the determined media information; and obtaining the session identifier and the channel information that are corresponding to the media object identifier carried in the media control policy, from the determined session request.

7. The media control method according to claim 5, wherein sending, by the conference center, the media operation instruction comprised in the media control policy, the obtained attribute information of the media object, and the obtained channel information to the user equipment that sends the session identifier comprises sending, by the network element device, a session message and a media configuration message to the user equipment that sends the session identifier, wherein the session message comprises the obtained channel information, wherein the media configuration message comprises the obtained attribute information of the media object, and wherein the media operation instruction comprised in the media control policy is sent using the session message or the media configuration message.

8. The media control method according to claim 1, further comprising:
comparing, by the conference center after obtaining the media information and the session request, the media object identifier carried in the media information with the media object identifier carried in the session request; and
establishing, when the media object identifier carried in the media information and the media object identifier carried in the session request are the same, a mapping relationship between the session identifier carried in the session request, the media object identifier, the channel information, and the attribute information of the media object corresponding to the media object identifier carried in the media information.

9. The media control method according to claim 1, further comprising sending the obtained media information to a device entity that is configured to present an interface, such that the device entity that is configured to present the interface displays the media object corresponding to the media object identifier carried in the received media information on a control interface.

10. A media control device, comprising:
a receiver configured to:
obtain media information sent from user equipment; and
receive a session request from the user equipment, wherein the media information carries a media object identifier and attribute information of a media object corresponding to the media object identifier, and wherein the session request carries a session identifier, the media object identifier, and information about a channel that is used to transmit the media object corresponding to the media object identifier;
a processor coupled to the receiver and configured to:
obtain, according to a media object identifier carried in a media control policy, attribute information of a media object corresponding to the media object identifier carried in the media control policy, from the media information;
obtain a session identifier and channel information that are corresponding to the media object identifier carried in the media control policy, from the session request; and
establish a data transmission channel with the user equipment according to the channel information; and
a transmitter coupled to the processor and configured to send a media operation instruction comprised in the media control policy, the obtained attribute information of the media object, and the obtained channel information to the user equipment that sends the session identifier, wherein the media operation instruction is used to instruct the user equipment to operate the received attribute information of the media object and the received channel information.

11. The media control device according to claim 10, wherein the receiver is further configured to:
send a session message to the user equipment that sends the session identifier, wherein the session message carries the obtained channel information; and
send a media configuration message to the user equipment that sends the session identifier, wherein the media configuration message carries the obtained attribute information of the media object, and wherein the media operation instruction comprised in the media control policy is sent using the session message or the media configuration message.

12. The media control device according to claim 10, wherein the receiver is further configured to receive a session notification from a network element device and receive the session request from the user equipment when the media control device is a conference application server, wherein the session notification carries media information and a session identifier of a session request that has an association relationship with the media information, wherein the media information is obtained by the network element device from a media announcement message from the user equipment, wherein the network element device provides a media resource function, wherein the association relationship between the media information and the session request is determined by the network element device according to the media object identifier carried in the received session request from the user equipment and a media object identifier carried in the received media announcement message from the user equipment, and wherein the media control device further comprises an association module configured to determine the association relationship between the received session request and the received media information according to the session identifier carried in the session request and the session identifier carried in the received session notification when the receiver receives the session request from the user equipment.

13. The media control device according to claim 12, wherein the transmitter is further configured to:
send a session message to the user equipment that sends the session identifier, wherein the session message carries the media operation instruction and the obtained channel information;
send the obtained attribute information of the media object and the obtained session identifier to the network element device; and
instruct the network element device to send a media configuration message to the user equipment that sends the obtained session identifier, wherein the media configuration message carries the obtained attribute information of the media object.

14. The media control device according to claim 10, wherein when the media control device is a network element device that provides a media resource function, the receiver is further configured to:
receive a media announcement message from the user equipment;
receive the session request from the user equipment; and
obtain the media information from the user equipment from the media announcement message, wherein the media announcement message carries the media information, and
wherein the media control device further comprises an association module configured to determine the association relationship between the obtained media information and the received session request according to the media object identifier of the media information carried in the media announcement message and the media object identifier carried in the session request when the receiver obtains the media information from the user equipment and receives the session request from the user equipment.

15. The media control device according to claim 14, wherein the receiver is further configured to receive a media control policy from a conference application server, and wherein the processor is further configured to:
- determine, according to a media object identifier carried in the media control policy, the media information and the session request that comprise the media object identifier carried in the media control policy and have the association relationship;
- obtain attribute information of a media object corresponding to the media object identifier carried in the media control policy, from the determined media information; and
- obtain a session identifier and channel information that are corresponding to the media object identifier carried in the media control policy, from the determined session request.

16. The media control device according to claim 14, wherein the transmitter is further configured to send a session message and a media configuration message to the user equipment that sends the session identifier, wherein the session message comprises the obtained channel information, wherein the media configuration message comprises the obtained attribute information of the media object, and wherein the media operation instruction comprised in the media control policy is sent using the session message or the media configuration message.

17. The media control device according to claim 10, wherein the media control device further comprises a comparison module configured to:
- compare the media object identifier carried in the media information with the media object identifier carried in the session request after the media information and the session request are obtained; and
- establish, when the media object identifier carried in the media information and the media object identifier carried in the session request are the same, a mapping relationship between the session identifier carried in the session request, the media object identifier, the channel information, and the attribute information of the media object corresponding to the media object identifier carried in the media information.

18. The media control device according to claim 10, wherein the transmitter is further configured to send the obtained media information to a device entity that is configured to present an interface, such that the device entity that is configured to present the interface displays the media object corresponding to the media object identifier carried in the received media information on a control interface.

19. A non-transitory computer readable storage medium encoded with computer program stored thereon for execution by a processor, wherein the computer program causes the processor to:
- obtain media information sent from user equipment;
- receive a session request from the user equipment, wherein the media information carries a media object identifier and attribute information of a media object corresponding to the media object identifier, and wherein the session request carries a session identifier, the media object identifier, and information about a channel that is used to transmit the media object corresponding to the media object identifier;
- obtaining, according to a media object identifier carried in a media control policy, attribute information of a media object corresponding to the media object identifier carried in the media control policy, from the media information;
- obtain a session identifier and channel information that are corresponding to the media object identifier carried in the media control policy, from the session request;
- send a media operation instruction comprised in the media control policy, the obtained attribute information of the media object, and the obtained channel information to the user equipment that sends the session identifier, wherein the media operation instruction is used to instruct the user equipment to operate the received attribute information of the media object and the received channel information; and
- establish a data transmission channel with the user equipment according to the channel information.

20. The non-transitory computer readable storage medium according to claim 19, further comprising instructions to cause the processor to:
- send a session message to the user equipment that sends the session identifier, wherein the session message carries the obtained channel information; and
- send a media configuration message to the user equipment that sends the session identifier, wherein the media configuration message carries the obtained attribute information of the media object, and wherein the media operation instruction comprised in the media control policy is sent using the session message or the media configuration message.

* * * * *

UNITED STATES PATENT AND TRADEMARK OFFICE
CERTIFICATE OF CORRECTION

PATENT NO. : 9,936,164 B2  
APPLICATION NO. : 15/468846  
DATED : April 3, 2018  
INVENTOR(S) : Yan Liu et al.

Page 1 of 1

It is certified that error appears in the above-identified patent and that said Letters Patent is hereby corrected as shown below:

On the Title Page

On page 2 under Other Publications should read:
"3$^{rd}$ Generation Partnership Project; Technical Specification Group Core Network and Terminals; Conferencing using the IP Multimedia (IM) CoreNetwork (CN) subsystem; Stage 3 (Release 12)," XP050925903, 3GPP TS 24.147, V12.3.0, Technical Specification, Sep. 2014, 209 pages.

In the Claims

Column 25; Line 42; Claim 3 should read:
announcement message from the user equipment, wherein Column 30; Line 14; Claim 19 should read:
obtain, according to a media object identifier carried in Signed and Sealed this
Fifteenth Day of May, 2018

Andrei Iancu
*Director of the United States Patent and Trademark Office*